United States Patent [19]

Onodera et al.

[11] Patent Number: 5,635,833

[45] Date of Patent: Jun. 3, 1997

[54] MAGNETIC LINEAR SCALING DEVICE HAVING PROTECTIVE RESIN TAPE

[75] Inventors: Yasuhiko Onodera; Osamu Ochiai, both of Tokyo, Japan

[73] Assignee: Sony Magnescale Inc., Tokyo, Japan

[21] Appl. No.: 355,311

[22] Filed: Dec. 12, 1994

[30] Foreign Application Priority Data

Dec. 16, 1993 [JP] Japan ................................ 5-316868

[51] Int. Cl.⁶ ........................... G01B 7/14; G01R 33/00
[52] U.S. Cl. ........................ 324/207.22; 324/207.24
[58] Field of Search ..................... 324/207.22, 207.24, 324/207.2, 207.21, 207.12, 225, 207.11; 335/303; 216/22

[56] References Cited

U.S. PATENT DOCUMENTS

| | | | |
|---|---|---|---|
| 4,484,391 | 11/1984 | Narimatsu | 33/125 |
| 4,649,648 | 3/1987 | Nagaoka et al. | 33/125 R |
| 4,843,729 | 7/1989 | Nagaoka et al. | 33/708 |
| 4,865,915 | 9/1989 | Okonogi et al. | 335/303 |
| 4,909,560 | 3/1990 | Ginn | 324/207.2 |
| 5,003,260 | 3/1991 | Auchterlonie | 324/207.24 |
| 5,016,359 | 5/1991 | Nagaoka et al. | 33/702 |
| 5,445,707 | 8/1995 | Toyama et al. | 216/22 |

*Primary Examiner*—Walter E. Snow
*Attorney, Agent, or Firm*—Foley & Lardner

[57] ABSTRACT

A magnetic linear scaling device including a stationary base and a magnetic scale secured to the stationary base. The magnetic scale has a track including a detection area in which magnetic scale data is recorded. A magnetic head is so disposed as to be movable along the magnetic scale in an opposed relation thereto. The magnetic head detects the magnetic scale data recorded in the detection area of the track. A resin tape covers at least the detection area of the track to protect the magnetic scale data from being damaged. The resin tape has a first surface attached to the magnetic scale and a second surface opposed to the magnetic head.

9 Claims, 4 Drawing Sheets

MAGNETIC LINEAR SCALING DEVICE HAVING PROTECTIVE RESIN TAPE

BACKGROUND OF THE INVENTION

The present invention relates to magnetic linear scaling devices for measuring magnitude of relative displacement of objects such as work and machine tool and the like.

Magnetic linear scaling devices are well known. One example of the magnetic linear scaling devices includes a magnetic scale having a track on which magnetic scale data is recorded, and a magnetic head movable along the magnetic scale to detect the magnetic scale data. The magnetic linear scaling devices are often used in an environment containing coolant, dust, cutting oil, or other contaminating elements during operation of the machine tool. These contaminating elements cause the magnetic scale data to be damaged, resulting in deteriorating accuracy of the detection by the magnetic head. There have been made attempts to protect the magnetic scale data on the track of the magnetic scale from any damage caused by such contaminating elements. One of the attempts, for instance, is to attach a stainless steel thin film of 0.3 mm thickness to the magnetic scale by means of an adhesive double coated tape. The stainless steel thin film must be subject to a demagnetizing process in advance of the attachment to the magnetic scale to make it magnetically neutral. In addition, when attaching the stainless steel thin film of a reduced thickness, for example less than 0.1 mm, the attachment operation is inconvenient. In another case, the magnetic scale has been coated with a solid-state lubricant, for example molybdenum disulfide, which has a thickness of only several microns to several ten microns. The coating layer is however insufficient in thickness so that the coating layer is easily peeled off from the magnetic scale. On the other hand, the coating layer with a sufficient thickness leads to increase in a manufacturing cost.

An object of the present invention is to provide an improved magnetic linear scaling device capable of performing accurate measurement by fully protecting magnetic scale data of a magnetic scale from being damaged without a reduction of cost performance.

SUMMARY OF THE INVENTION

According to one aspect of the present invention, there is provided a magnetic linear scaling device comprising:

a stationary base;

a magnetic scale secured to the stationary base, the magnetic scale having a track including a detection area in which magnetic scale data is recorded;

a magnetic head so disposed as to be movable along the magnetic scale in an opposed relation thereto, the magnetic head detecting the magnetic scale data recorded in the detection area of the track; and a resin tape covering at least the detection area of the track, the resin tape having a first surface attached to the magnetic scale and a second surface opposed to the magnetic head.

DESCRIPTION OF THE PREFERRED EMBODIMENT

Figure 1:
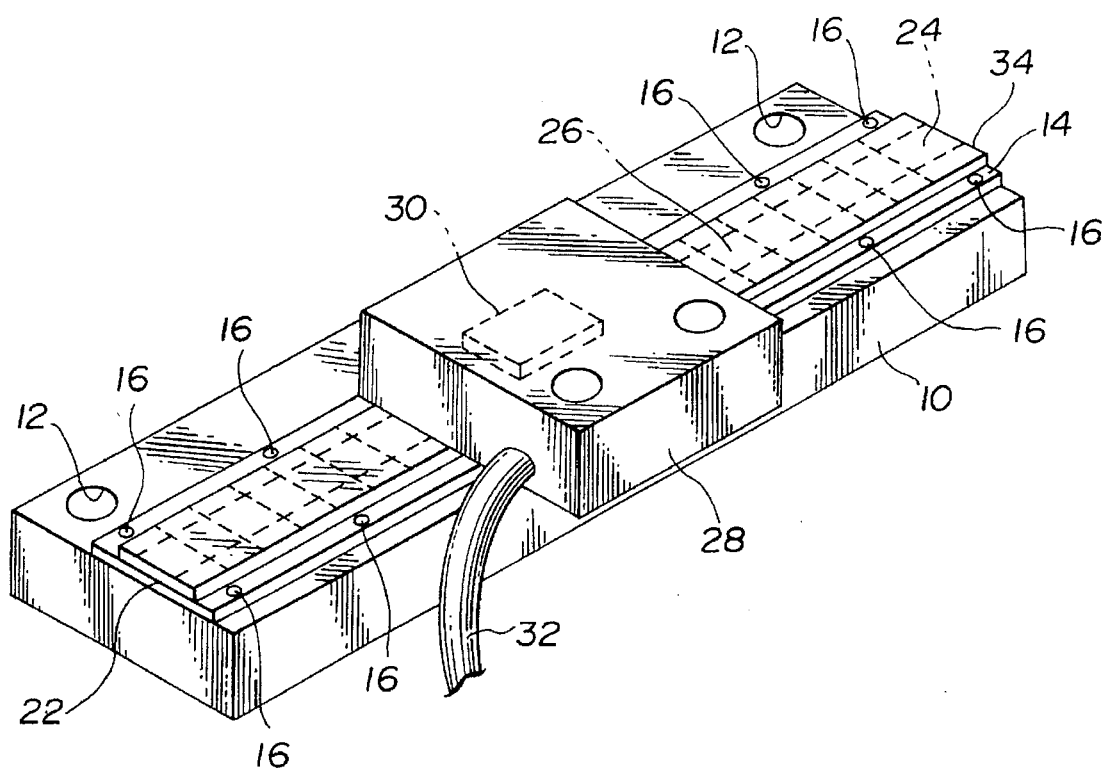
FIG. 1 is a perspective view of one preferred embodiment of a magnetic scaling device according to the present invention, which includes a stationary base, a magnetic scale, and a magnetic head.

Referring now to FIG. 1, the preferred embodiment of a magnetic linear scaling device according to the present invention is described.

Figure 2A:
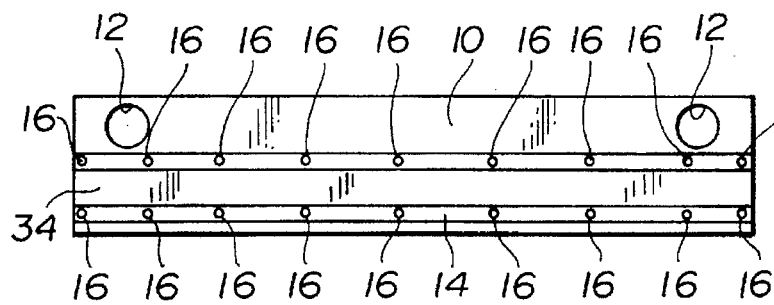
FIG. 2(A) is a schematic top plan view of the magnetic scale secured to the stationary base by spot welding.
Figure 2B:
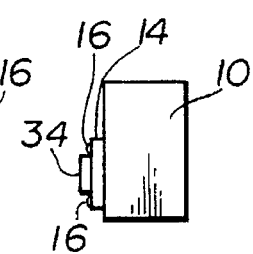
FIG. 2(B) is a side view of FIG. 2(A)
Figure 4B:
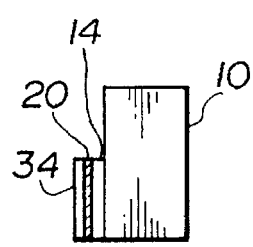
FIG. 4(B) is a side view of FIG. 4(A)
Figure 5:
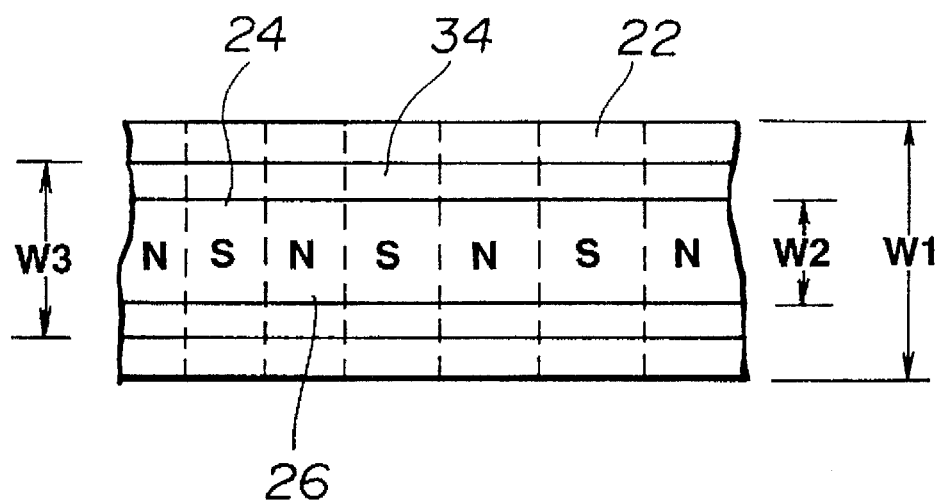
FIG. 5 is an explanatory diagram of a relation between a track of the magnetic scale, a detection area of the track, and a resin tape covering the detection area.

As illustrated in FIG. 1, the magnetic linear scaling device includes a stationary base 10. The stationary base 10 is made of a material having an increased rigidity, such as stainless steel, aluminum and iron. An elongated magnetic scale 14 is secured to the stationary base 10 by spot welding. Nuggets 16 are disposed at longitudinal opposite edges of the magnetic scale 14 as illustrated in FIGS. 1, 2(A) and 2(B). The magnetic scale 14 may be secured to the stationary base 10 by means of screws 18 shown in FIGS. 3(A) and 3(B) or by an adhesive agent 20 shown in FIG. 4(B). The adhesive agent 20 may be replaced by an adhesive double coated tape. The magnetic scale 14 is in the form of a thin film made of a magnetic material including a rubber magnet, which has a reduced rigidity. The magnetic scale 14 has thereon at least one track 22 extending in the longitudinal direction of the magnetic scale 14. The track 22 may include a reference signal track and an incremental signal track. The track 22 includes a detection area 24 in which magnetic scale data 26 is recorded, as illustrated in FIG. 5. The magnetic scale data 26 is detected by a magnetic head 28 as shown in FIG. 1.

The magnetic head 28 is so disposed as to be movable along the magnetic scale 14 in an opposed relation thereto. Specifically explained, there is a clearance between the magnetic head 28 and the magnetic scale 14 opposed to the magnetic head 28. The magnetic head 28 includes a magnetoresistance element 30 opposed to the track 22 of the magnetic scale 14. The magnetoresistance element 30 detects the magnetic scale data 26 in the detection area 24 of the track 22 and generates a signal indicative of the magnetic scale data 26 detected, when the magnetic head 28 passes over the detection area 24 of the track 22. The magnetoresistance element 30 may be replaced by another type of magnetic sensor such as magnetic flux-responsive type equipments. Reference numeral 32 denotes a cable transmitting the signal generated from the magnetoresistance element 30.

Figure 9A:
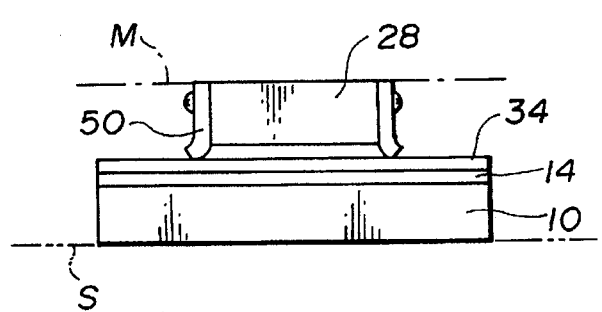
FIG. 9(A) is a front elevation of the magnetic scaling device, showing the magnetic head with wipers.

Upon installing the magnetic scaling device on a machine tool, for example, the stationary base 10 is secured to a stationary portion S as indicated in FIG. 9(A), of the machine tool, and the magnetic head 28 is secured to a movable portion M as indicated in FIG. 9(A), of the machine tool.

A resin tape 34 covers at least the detection area 24 of the track 22. The resin tape 34 has a first surface 34A, viz. lower surface as viewed in FIG. 6, attached to the magnetic scale 14 and a second surface 34B, viz. upper surface as viewed in FIG. 6, opposed to the magnetic head 28. The resin tape 34 protects the magnetic scale data 26 in the detection area 24 from being damaged in the environment.

Figure 3A:
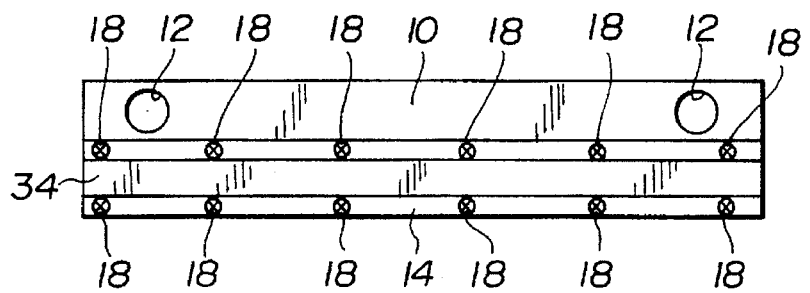
FIG. 3(A) is a schematic top plan view of the magnetic scale secured to the stationary base by means of fastening screws.
Figure 3B:
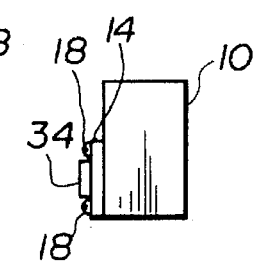
FIG. 3(B) is a side view of FIG. 3(A)
Figure 4A:
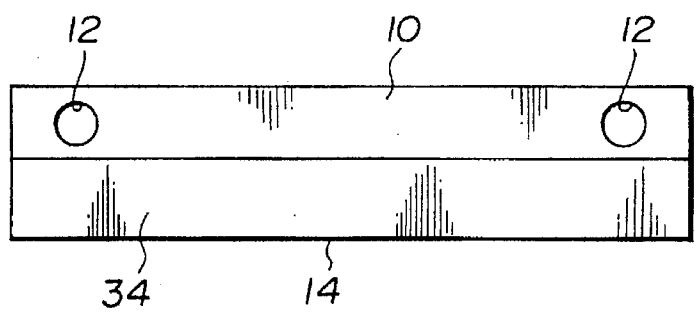
FIG. 4(A) is a schematic top plan view of the magnetic scale secured to the stationary base by an adhesive agent.

As illustrated in FIG. 5, the track 22 of the magnetic scale 14 has a width W1 extending in a transverse direction of the magnetic scale 14. The detection area 24 has a width W2 which extends in same direction as the width W1 and smaller than the width W1. The width W2 is determined by a sum of an actual detection width over which the magnetoresistance element 30 detects the magnetic scale data 26, and a tolerance for attachment of the magnetoresistance element 30 to the magnetic head 28. The resin tape 34 has a width W3 greater than the width W2 such that the resin tape 34 covers the whole of the detection area 24 of the track 22. Thus, the magnetic scale data 26 in the detection area 24 is entirely protected by the resin tape 34 from being damaged. If the magnetic scale 14 is secured to the stationary base 10 by the spot welding as shown in FIGS. 2(A) and 2(B) or the screws 18 as shown in FIGS. 3(A) and 3(B), a top surface of the magnetic scale 14 is uneven due to the nuggets 16 or the screws 18 projecting outward therefrom. The attachment of the resin tape 34 to the uneven surface of the magnetic scale 14 tends to cause release of the resin tape 34 therefrom. In this condition, the resin tape 34 is so arranged as to expose the nuggets 16 or the screws 18 therefrom but to conceal the detection area 24 of the track 22. If the magnetic scale 14 is secured to the stationary base 10 by the adhesive agent 20 or adhesive double coated tape whereby the top surface of the magnetic scale 14 is even, the resin tape 34 may be disposed to entirely cover the top surface of the magnetic scale 14 as shown in FIGS. 4(A) and 4(B).

The resin tape 34 may be in the form of a thin film preferably made of a thermoplastic resin, for instance polyester, polyethylene, polytetrafluoroethylene, polystyrene, nitrocellulose, celluloseacetate, polyamide, polycarbonate, polychlorotrifluoroethylene and polypropylene. The resin tape 34 has a reduced modulus of longitudinal elasticity. For instance, a modulus of longitudinal elasticity of polystyrene is $0.4 \times 10^{10}(N \cdot m^{-2})$ which is less than $21 \times 10^{10}(N \cdot m^{-2})$ of a modulus of longitudinal elasticity of iron. When subject to change of an ambient temperature, the resin tape 34 having the reduced modulus of longitudinal elasticity exhibits an expansion or compression rate similar to that of the magnetic scale 14. Thus, the resin tape 34 does not influence the detection of the magnetic scale data 26 on the magnetic scale 14 even in a case where the ambient temperature changes.

Figure 6:
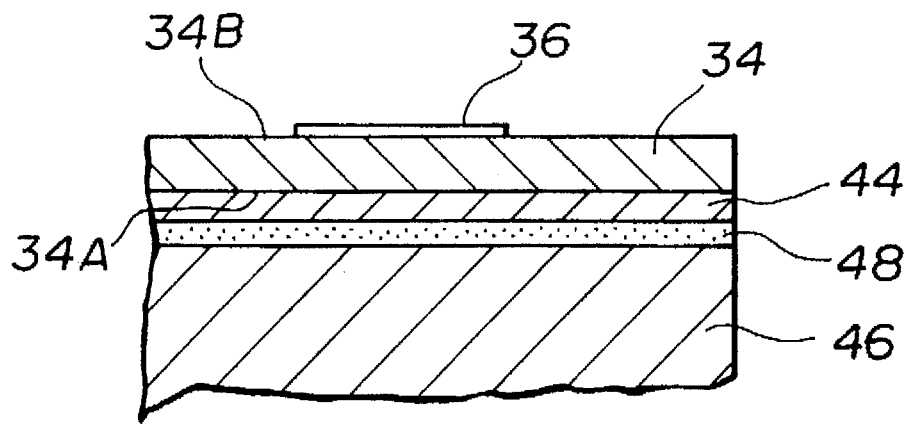
FIG. 6 is a cross section of a layered structure including the resin tape.

As illustrated in FIG. 6, the resin tape 34 is formed with a vacuum evaporated aluminum layer 44 on the first surface 34A. An adhesive layer 48 is provided on a lower surface as viewed in FIG. 6, of the vacuum evaporated aluminum layer 44. Thus, there is provided a triplex layered structure consisting of the resin tape 34, the vacuum evaporated aluminum layer 44 and the adhesive layer 48. For easy arrangement of the triplex layered structure on the magnetic scale 14, further provided is a released paper 46 containing a silicone compound as shown in FIG. 6. The resin tape 34 is applied with the vacuum evaporated aluminum layer 44 via the adhesive layer 48 to the top surface of the magnetic scale 14 by peeling the released paper 46 off. Thicknesses of the resin tape 34, the vacuum evaporated aluminum layer 44 and the adhesive layer 48 are respectively determined as follows. For example, when the triplex layered structure is approximately 0.1 mm in thickness, the thickness of the resin tape 34 is set to approximately 0.08 mm and a sum of the thickness of the remaining two layers to approximately 0.02 mm.

The sum of the thicknesses of the three layers, viz. the resin tape 34, the vacuum evaporated aluminum layer 44 and the adhesive layer 48, actually depends on the clearance between the magnetic scale 14 and the magnetic head 28. Namely, the sum of the thicknesses of the three layers is selected within a range less than the clearance for a smooth movement of the magnetic head 28 along the magnetic scale 14 without contact with the magnetic scale 14. The clearance is determined by a reproducing wavelength used in the magnetoresistance element 30 of the magnetic head 28. For example, when the reproducing wavelength of about 0.3 mm is used, the clearance of about 0.2 mm is necessary and then a suitable thickness of the resin tape 34 is about 0.05 mm. Alternatively, when the reproducing wavelength of about 10 mm is used, the clearance is about 3 mm and then the resin tape 34 is of 0.3 mm or more thickness. In a typical example, if the reproducing wavelength of 1 mm is used, the clearance is required to be approximately 0.5 mm and therefore the resin tape 34 of approximately 0.1 mm in thickness is appropriate. Thus, the thickness of the resin tape 34 is determined based on the clearance between the magnetic scale 14 and the magnetic head 28.

Figure 7:
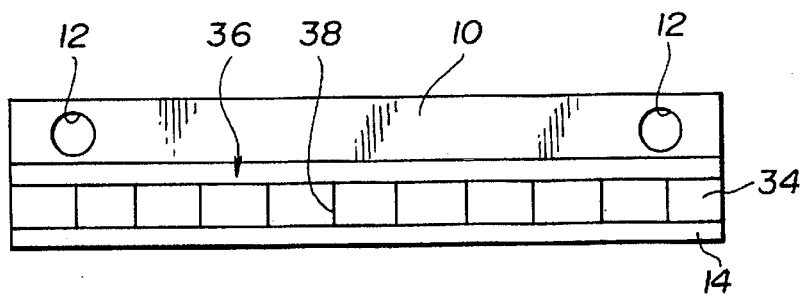
FIG. 7 is a schematic top plan view of information marks provided on the resin tape.
Figure 8:
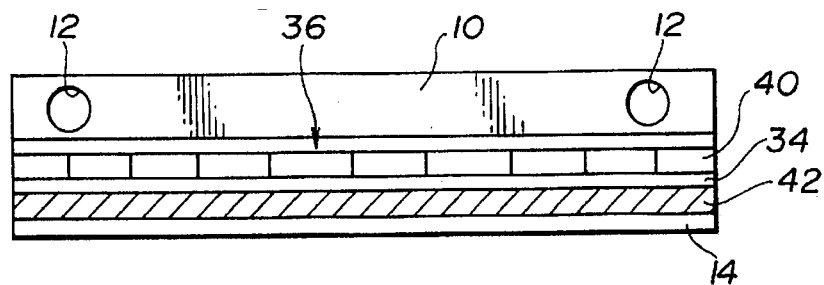
FIG. 8 is a schematic top plan view of information marks of a different kind from those of FIG. 7.

As illustrated in FIG. 6, the resin tape 34 has information marks 36 on the second surface 34B. The information marks 36 are kept clearly visible by the vacuum evaporated aluminum layer 44 formed on the first surface 34A of the resin tape 34. The information marks 36 include scale marks 38 arranged at a spaced relation in the longitudinal direction of the magnetic scale 14 as shown in FIG. 7. The scale marks 38 may be provided by a relief printing before or after cutting the resin tape 34 into the width W3 as shown in FIG. 5. The scale marks 38 may be in a predetermined spaced relation therebetween, for instance at an equal distance or unequal distance. The information marks 36 may be printed with variation of colors or patterns as indicated at numerals 40 and 42 of FIG. 8, respectively. The colored information mark 40 and the patterned information mark 42 are arranged on the second surface 34B of the resin tape 34 in alignment with the corresponding magnetic data on the reference signal track and the incremental signal track of the magnetic scale 14, respectively.

Figure 9B:
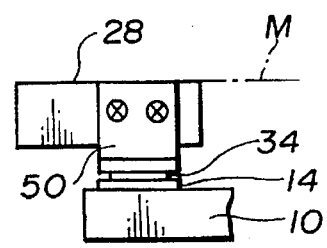
FIG. 9(B) is a side view of FIG. 9(A).

As illustrated in FIGS. 9(A) and 9(B), the magnetic head 28 is usable with wipers 50 in an environment containing contaminating elements such as coolant, particulate dust and cutting oil. The wipers 50 may be made of rubber, resin or the like and fixed to two opposed side walls of the magnetic head 28 which are spaced in a direction of the movement of the magnetic head 28. When the magnetic head 28 moves along the magnetic scale 14, the wipers 50 slide on the resin tape 34 attached to the magnetic scale 14 and sweep the contaminating elements off therefrom. In this condition, the resin tape 34 protects the magnetic scale data 26 in the detection area 24 of the track 22 from being damaged due to frictional contact with the wipers 50 or by rigid foreign substances such as metal particles caught between the resin tape 34 and the wipers 50. Thus, the resin tape 34 serves for maintaining accuracy of the detection of the magnetic scale data 26 by the magnetic head 28.

As is appreciated from the above description, the magnetic linear scaling device according to the present invention is capable of protecting magnetic scale data 26 on the track 22 of the magnetic scale 14 in a simple arrangement of the resin tape 34 on the magnetic scale 14. This leads to increase in a cost performance. The resin tape 34 gives no influence on the detection of the magnetic scale data 26 because the resin tape 34 is made of non-magnetic material. The arrangement operation of the resin tape 34 on the magnetic scale 14 is readily performed as explained above. In addition, the information marks 36 provided on the resin tape 34 are visible and thus convenient or helpful to an operator of the magnetic linear scaling device.

What is claimed is:

1. A magnetic linear scaling device comprising:

a stationary base;

a magnetic scale secured to said stationary base, said magnetic scale having a track including a detection area in which magnetic scale data is recorded;

a magnetic head so disposed as to be movable along said magnetic scale in an opposed relation thereto, said magnetic head detecting said magnetic scale data recorded in said detection area of said track; and a resin tape covering at least said detection area of said track, said resin tape having a first surface attached to said magnetic scale and a second surface opposed to said magnetic head, wherein said resin tape has information marks on said second surface.

2. A magnetic linear scaling device comprising:

a stationary base;

a magnetic scale secured to said stationary base, said magnetic scale having a track including a detection area in which magnetic scale data is recorded;

a magnetic head so disposed as to be movable along said magnetic scale in an opposed relation thereto, said magnetic head detecting said magnetic scale data recorded in said detection area of said track; and a resin tape covering at least said detection area of said track, said resin tape having a first surface attached to said magnetic scale and a second surface opposed to said magnetic head, wherein said resin tape is formed with a vacuum evaporated aluminum layer on said first surface.

3. A magnetic linear scaling device as claimed in claim 1, wherein said resin tape is formed with a vacuum evaporated aluminum layer on said first surface.

4. A magnetic linear scaling device as claimed in claim 1, wherein said information marks include scale marks disposed in a predetermined spaced relation.

5. A magnetic linear scaling device as claimed in claim 2, wherein an adhesive layer is provided on said vacuum evaporated aluminum layer.

6. A magnetic linear scaling device as claimed in claim 3, wherein an adhesive layer is provided on said vacuum evaporated aluminum layer.

7. A magnetic linear scaling device as claimed in claim 1, wherein said resin tape is a thermoplastic resin selected from the group consisting of polyester, polyethylene, polytetrafluoroethylene, polystyrene, nitrocellulose, celluloseacetate, polyamide, polycarbonate, polychlorotrifluoroethylene and polypropylene.

8. A magnetic linear scaling device comprising:

a stationary base;

a magnetic scale secured to said stationary base, said magnetic scale having a track including a detection area in which magnetic scale data is recorded;

a magnetic head so disposed as to be movable along said magnetic scale in an opposed relation thereto, said magnetic head detecting said magnetic scale data recorded in said detection area of said track; and a resin tape covering at least said detection area of said track, said resin tape having a first surface attached to said magnetic scale and a second surface opposed to said magnetic head, wherein said resin tape has a modulus of longitudinal elasticity less than that of said magnetic scale, and wherein, when an ambient temperature of an environment of said magnetic linear scaling device changes, the resin tape exhibits a substantially similar compression or expansion rate as that of the magnetic scale.

9. A magnetic linear scaling device as recited in claim 7, wherein said resin tape has a modulus of longitudinal elasticity less than that of said magnetic scale, wherein, when an ambient temperature of an environment of said magnetic linear scaling device changes, the resin tape exhibits a substantially similar compression or expansion rate as that of the magnetic scale.

* * * * *